(40.)

JAMES GILLIES. Bung Inserters.

No. 122,006. Patented Dec. 19, 1871.

Witnesses:
Alex F. Roberts
Frank Blockley

Inventor
James Gillies
per Munn & Co Attorneys

UNITED STATES PATENT OFFICE.

JAMES GILLIES, OF GLASGOW, GREAT BRITAIN.

IMPROVEMENT IN BUNG-INSERTERS.

Specification forming part of Letters Patent No. 122,006, dated December 19, 1871.

*To all whom it may concern:*

Be it known that I, JAMES GILLIES, of the city of Glasgow, in the county of Lanark, Scotland, Great Britain, brewers' engineer, have invented Improvement in Means for Fixing Bushes for Bung-Holes of Casks, &c.; and I do hereby declare that the following is a full, clear, and exact description thereof, which will enable others skilled in the art to make and use the same, reference being had to the accompanying drawing forming part of this specification.

My invention consists in the construction of a device for inserting, removing, &c., of screw-threaded metallic bushes for the bung-holes of casks and other like holes in other vessels.

Figure 1:
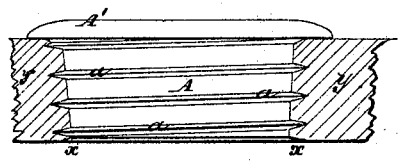
Figure 2:
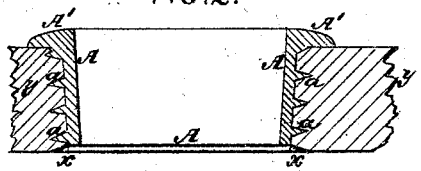

In the drawing, Figures 1 and 2 represent side views of a tapered metallic bush, A, provided with thread $a$ and screwed into a hole, $x$, in the stave $y$. It is provided with a broad collar, $A^1$, on the upper end, made smooth on the inner side, and has a small fillet, $e$, close under the collar $A^1$.

My improved tool, shown in Figs. 3 to 6, for fixing and removing these and other suitably-constructed bushes, is formed of a main round spindle, B, with a square head at top, (for being turned by a powerful ordinary straight two-armed wrench or lever, with the hole in the center such as used for turning screw-taps and wideners,) having a toothed or serrated conical boss or segmental piece, C, mounted loosely and eccentrically on its lower end, where it is prevented from coming off by the screw-nut $b$; the spindle B having the complementary segmental eccentric piece (of and opposite to the serrated eccentric piece C) formed on it as a duplex-cam, $B''$ $B^2$, the two-part cam $B''$ $B^2$ fitting and filling the conical interior of the bush A, so that when inserted in it the turning of the spindle B in the eye of the eccentric of the boss C, by the wrench at the top, causes one or the other of the wings $B''$ $B^2$ to act as an eccentric wedge or cam and press the teeth $C'$ of the griping-boss $C'''$ into the inner surface of the bush A, the griping action of the teeth increasing in proportion to the force required to turn or tighten and fix the bush A, just also as the bush is getting further into the wood, which strengthens and sustains it for the necessary outward pressure of the cam tool, which can then get a stronger tap on the head $B^1$ to insure the non-slipping of the teeth $C'$ within the bush. The opening $c$ between the segmental parts of the cam indicate the small amount of motion of the spindle B required to give the griping action and power, and the lines 1 and 2 and the arrow 3, in Figs. 5 and 6, respectively, show the axis of the spindle B and that of the griping eccentric C, and the direction in which the former is turned to screw or insert the bush.

Both the spindle B and griping-boss C are preferred to be made of the best steel and tempered especially at the acting parts, so as thus to maintain or lengthen the time of the wearing efficiency of the tool.

Figure 7:
Figure 8:
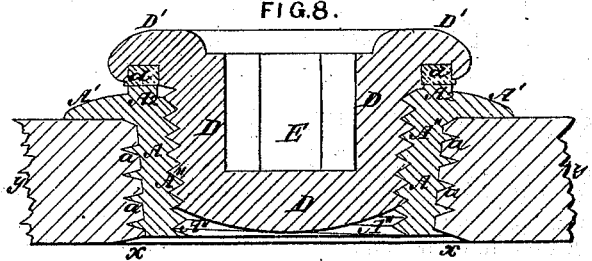
Figure 3:
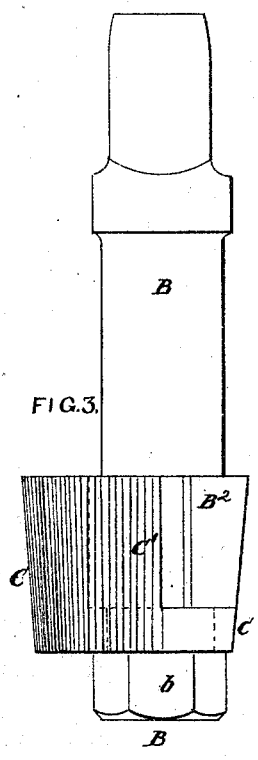
Figure 9:
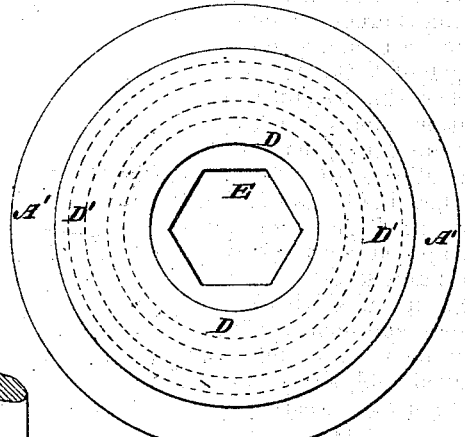
Figure 5:
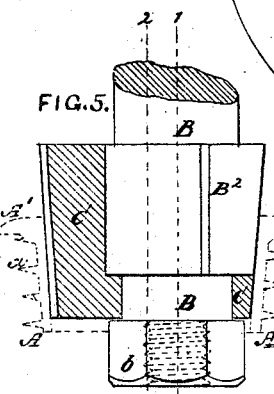
Figure 10:
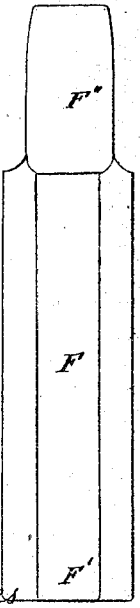
Figure 11:
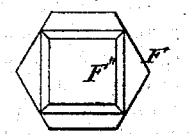
Figure 4:
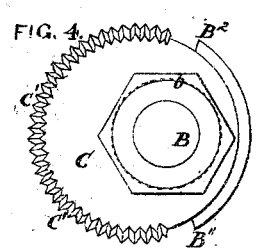
Figure 6:
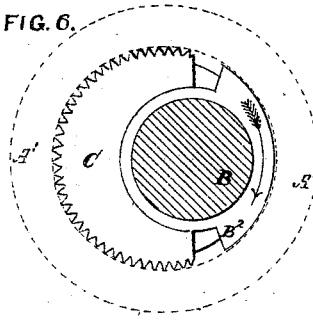
Figure 12:

In Figs. 7, 8, and 9, I have represented a screw-plug, D, applied to the bush A and having an overlapping flange, $D'$; also a groove for receiving an elastic ring, $d$, which fits on the surface $A^2$ of bush A. The hexagonal eye E is for receiving the end $F'$ of the steel key mandrel F, shown in Figs. 10, 11, and 12, whereby the plug may be screwed in and out.

I do not, however, claim these; but

What I do claim is—

The conical, eccentric, or cam-acting key B C, constructed substantially as described.

The above specification of my invention is signed by me this 22d day of August, 1871.

JAMES GILLIES.

Witnesses:
JOHN THOMSON,
    20 *Buchanan street, Glasgow.*
THOMAS RUSSELL,
    20 *Buchanan street, Glasgow.* (40)